June 2, 1931.  L. S. PFOUTS  1,808,065
FREEZING CYLINDER
Filed July 25, 1927
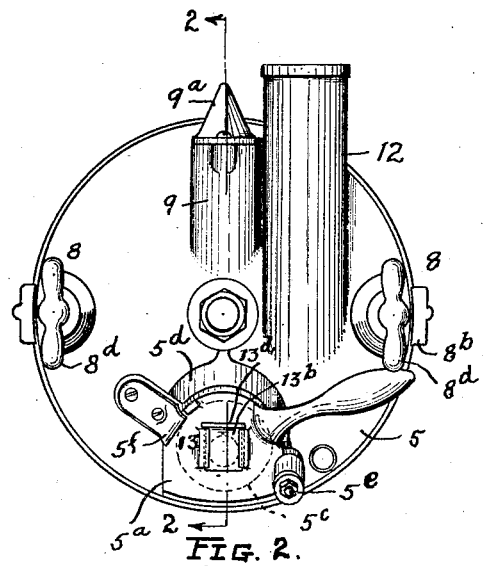
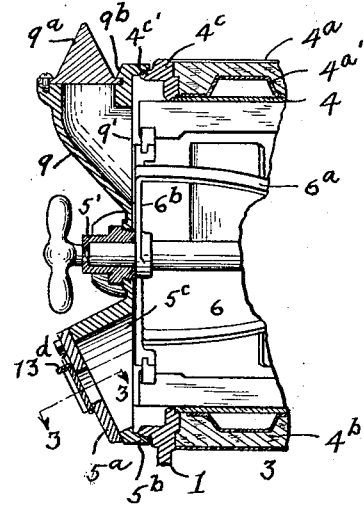
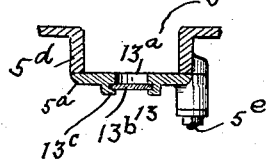
Inventor
Leroy S. Pfouts
By Geo. A. Pitts
Attorney Patented June 2, 1931

1,808,065

UNITED STATES PATENT OFFICE

LEROY S. PFOUTS, OF CANTON, OHIO, ASSIGNOR TO THE H. H. MILLER INDUSTRIES COMPANY, OF CANTON, OHIO, A CORPORATION OF OHIO

FREEZING CYLINDER

Application filed July 25, 1927. Serial No. 208,235.

This invention relates to apparatus for freezing materials such as ice cream and the like.

One object of the invention is to provide a freezing cylinder having an improved head which is provided with two discharge valves of different sizes or capacities, whereby the smaller one permits the discharge of a small quantity of material for testing purposes and the larger one provides for the discharge of a large quantity of material as when emptying the cylinder.

Another object of the invention is to provide a freezing cylinder having a compound or duplex valve mechanism permitting the discharge of varying quantities of material.

Another object of the invention is to provide in the head of a horizontal freezing cylinder a plurality of valves of different capacities in the lower portion of the head.

Other objects of the invention will be apparent to those skilled in the art to which my invention relates from the following description taken in connection with the accompanying drawings, wherein Fig. 1 is a front view of a freezing cylinder.

Fig. 2 is a fragmentary section on the line 2—2 of Fig. 1.

Fig. 3 is a section on the line 3—3 of Fig. 2.

I have shown in the accompanying drawings my invention applied to a horizontal type of freezing cylinder, but in its broader aspects the invention is equally adapted to an upright or vertical type where the discharge takes place through its lower head or lower position. While the invention is applied to the cylinder head, it may be applied to the side wall or portion of the cylinder, so that in the use of the term head it is not intended that the invention is to be so limited.

In the drawings, 1 indicates a support, only a portion thereof being shown; but such support may be similar to that shown in Letters Patent No. 1,449,623 granted to me March 27, 1923. 3 indicates a freezing cylinder mounted on the support 1 and supporting a batch tank (not shown) connected by a valved conduit with the cylinder 3 in the usual manner.

The freezer 3 comprises a cylinder 4, a rear head and a front head 5, which form the freezing space or chamber. The front and rear heads are provided with bearings in which the shaft or shafts of material agitating and scraping members or elements 6 rotate. The bearing carried by the front head is indicated at 5'. Its outer wall is provided with screw threads to fit a threaded opening formed in the head, as shown in Fig. 2. The agitating members 6 may be of any desired construction, but preferably include one or more devices 6a which are arranged to propel the material toward the discharge end of the freezer in order to force the material therefrom when the discharge valve 5a is opened. The material agitating and scraping members are operated in any well-known manner by suitable mechanism; by preference the scraping members are rotated in clock-wise direction when facing the front head of the freezer, for a purpose to be later described.

The freezer cylinder 4 may be surrounded by a jacket which preferably includes a cylinder 4a; between the cylinders 4 and 4a may be provided a corrugated sheet 4a' to form a circuitous conduit for the refrigerant; while the space between the cylinders 4 and 4a, and surrounding the corrugated sheet 4a' may be filled with some non-conductor of heat, such as ground cork, as shown at 4b. At its front end, the freezer 3 is provided with an annulus 4c to which the outer or front ends of the cylinders 4 and 4a are secured. The refrigerant used is preferably brine, it being supplied to the conduit by a suitable pipe.

4c' indicates a bearing ring, preferably formed integral with the annulus 4c and adapted to be engaged by a flange 5b carried by the front head 5. The flange 5b is preferably grooved to receive the ring 4c', these parts being accurately ground to form a liquid tight joint between the freezer cylinder 4 or the annulus therefor, and the head 5.

8 indicates devices for removably securing the head 5 to the annulus 4c. These devices preferably comprise a plurality of arms having inturned ends 8b, secured to the annulus 4c, and rotatable cams carried by the head 5. The cams are arranged to engage the under surfaces of the inturned ends 8b, which co-act to press the head flange 5b against the ring 4c'. Each cam 8c has a handle 8d by which it may be operated. The securing devices may be similar to the like devices shown in my aforesaid patent.

5c indicates a discharge opening formed in the lower portion of the head 5. This opening is preferably surrounded by a wall 5d, which may serve as a nozzle to direct the frozen material downwardly. The wall 5d is preferably formed integral with the head 5 and its outer end edge serves as a seat for the valve 5a. The valve 5a is preferably pivoted on a shaft 5e. 5f indicates a stop which limits the movement of the valve when it is opened.

9 indicates a duct leading to an opening 9' formed in the upper portion of the freezer front head 5, the walls of the duct and head being preferably formed integral. The center of the opening 9' is preferably disposed in a vertical plane which cuts the axis of the freezer. In the present disclosure of an ice cream freezing apparatus, the opening 9' is shown as an inspection opening; and when so used I may provide the upper end of the duct with a closing cap 9a. The cap may be pivotally connected to the wall of the duct, as shown in Fig. 2. The cap 9a is held to its seat, when closed, by engagement with a lip 9b formed integrally on the head 5. One function of the duct 9 is to permit the escape of air from the freezer during filling, the cap 9a being opened for this purpose. Another function of the duct 9 is to permit from time to time inspection of the material being frozen within the freezing cylinder to determine its condition.

12 indicates a separate duct leading to an opening formed in the front freezer head 5, the walls of the duct 12 and head 5 being preferably formed integral. The opening in the head 5 is preferably arranged at that side of the axis of the freezer, relative to which the arms 6b of the scraping members 6, when rotating, move downwardly. As already described herein, the scraping members 6 move in a clock-wise direction when looking at the freezer front head; accordingly, the opening is arranged at the right of the axis of the agitating members 6 and the duct 9, as viewed in Fig. 1. The inlet opening preferably extends vertically from a point below a horizontal line cutting the axis of the freezer to a point near the perimeter of the head 5, so that the fruit will engage with the scrapers and scraper arms as soon as the latter commence to move downwardly in rotating about their axes. The duct 12 preferably extends upwardly to a point above the duct 9 and above the upper edge of the freezer 3. The duct 12 preferably extends upwardly parallel to the duct 9. The inner wall of the duct 12 is preferably ground to form a seat for the lower end of an inlet and funnel member (not shown).

The valve 5a has a relatively large capacity so that the entire batch of frozen material may be quickly discharged due to the action of the propelling devices 6a and partly gravity in a horizontal freezer or the action of gravity in a vertical freezer, to insure uniformity of the material.

13 indicates a supplemental valve which has a smaller capacity than the valve 5a and in the preferred form of construction the capacity of this valve is relatively small as compared to the valve 5a. In the operation of freezing apparatus it is necessary to take samples of the material as freezing takes place to test the same, by weighing, inspection or otherwise, to determine its overrun. In the present practice it is customary to open the emptying valve and allow a quantity of the material to escape, but due to its large capacity (which must be ample to permit of quick emptying) and the fact that the testing receptacle is of relatively small unit capacity, such operation permits more material to escape than is required for the test. This operation is sometimes repeated several times in the freezing of a batch before the operative effects the desired overrun. As a result great waste occurs and the excess material flows onto the floor and melts and hence causes undesirable conditions to prevail. The valve 13 serves to permit the ready discharge of a small quantity of material so that the testing receptacle can be filled without waste and without the material getting on the floor. The valve 13 may be disposed on any portion of the head for example at one side of the valve 5a, but in the illustrated form of construction it is mounted on the latter. This preferred arrangement simplifies the construction of the head and provides ample room thereon for the ducts 9 and 12, the bearing 5' and emptying valve 5a. It also permits both valves to be mounted in the lower portion of the head. It also enables my invention to be applied to cylinders already constructed merely by the substitution of the valve 5a.

The valve 13 may comprise an opening 13a formed in the valve 5a and a plate 13b movable relative to the opening to open and close it. Preferably the plate 13b slidably fits suitable guides 13c on the valve, a lug 13d permitting the plate to be operated in the guides and serving as a stop to limit the movement of the valve downwardly to its closed position.

In the arrangement of the valves as shown, each may be operated independently of the other, both are in the lower central position of the cylinder head and the provision of the supplemental valve does not affect the size of the inlets and number of other devices provided on the head, or the arrangement of these devices.

To those skilled in the art to which my invention relates, many alterations in construction and widely differing embodiments and applications of my invention will suggest themselves, without departing from the spirit and scope thereof. My description and disclosures herein are purely illustrative and are not intended to be in any sense limiting.

What I claim is:

1. In an apparatus of the class described, the combination of a horizontal cylinder having a head at one end, said head being formed with a discharge opening, a valve member for controlling the discharge of material through said opening from said cylinder, and a separate valve provided on said valve member for controlling the discharge from said cylinder through said opening, said valve member and the valve member of said separate valve being movable independently of each other.

2. In an apparatus of the class described, the combination of a horizontally disposed cylinder, having a head and formed with a discharge opening in its lower portion, a valve member mounted on said head and arranged to control the discharge of material through said opening, a relatively small valve carried by said valve member and arranged to permit the discharge of a relatively small quantity of material independently of said valve member and while the latter is in closed position, and separate means for operating said valve member and said valve independently.

3. A valve mechanism comprising a valve seat, a valve element movable relative to said seat and formed with an opening adapted to register with said valve seat when said valve element is seated and forming a separate valve seat, a valve element movably mounted on said first mentioned valve element to engage and disengage the last mentioned valve seat, and separate means for operating said valve elements independently.

4. A valve mechanism comprising a valve seat, a valve element consisting of a plate movable edgewise in its own plane relative to said seat to open and close the valve and formed with an opening adapted to register with said valve seat when said valve element is seated, said opening forming a separate valve seat, a valve element movably mounted on said first mentioned valve element to engage and disengage the last mentioned valve seat, and separate means for operating said valve elements independently.

In testimony whereof, I have hereunto subscribed my name.

LEROY S. PFOUTS.